(12) United States Patent
Georges Des Aulnois et al.

(10) Patent No.: US 11,067,872 B2
(45) Date of Patent: Jul. 20, 2021

(54) OPTICAL PARAMETRIC OSCILLATOR

(71) Applicant: BLUE INDUSTRY AND SCIENCE, Paris (FR)

(72) Inventors: Johann Georges Des Aulnois, Versailles (FR); Benjamin Szymanski, Le Pre-Saint-Gervais (FR)

(73) Assignee: BLUE INDUSTRY AND SCIENCE, Paris (FR)

( * ) Notice: Subject to any disclaimer, the term of this patent is extended or adjusted under 35 U.S.C. 154(b) by 0 days.

(21) Appl. No.: 16/975,566

(22) PCT Filed: Feb. 27, 2019

(86) PCT No.: PCT/FR2019/050448
§ 371 (c)(1),
(2) Date: Aug. 25, 2020

(87) PCT Pub. No.: WO2019/166740
PCT Pub. Date: Sep. 6, 2019

(65) Prior Publication Data
US 2020/0401011 A1   Dec. 24, 2020

(30) Foreign Application Priority Data
Mar. 1, 2018   (FR) ...................... 18 51802

(51) Int. Cl.
*G02F 1/35* (2006.01)
*G02F 1/355* (2006.01)
*G02F 1/39* (2006.01)

(52) U.S. Cl.
CPC .......... *G02F 1/3501* (2013.01); *G02F 1/3551* (2013.01); *G02F 1/39* (2013.01); *G02F 1/3509* (2021.01); *G02F 2202/20* (2013.01)

(58) Field of Classification Search
CPC ........ G02F 1/3501; G02F 1/3551; G02F 1/39; G02F 2001/3509; G02F 2202/20
See application file for complete search history.

(56) References Cited

U.S. PATENT DOCUMENTS 6,259,711 B1    7/2001  Laurell
7,620,077 B2 *  11/2009 Henderson ............ H01S 3/0675
                                                         372/6
(Continued)

OTHER PUBLICATIONS

Powers et al., "Continuous tuning a continuous-wave periodically poled lithium niobate optical parametric oscillator by use of a fan-out grating design", Optics Letters, vol. 23, No. 3, pp. 159-161, Feb. 1, 1998. (Year: 1998).*

(Continued)

*Primary Examiner* — Daniel Petkovsek
(74) *Attorney, Agent, or Firm* — Ipsilon USA, LLP

(57) ABSTRACT

A doubly resonant optical parametric oscillator (1) includes a fan-out crystal (5, 55, 105) having an optical non-linearity of order 2 and placed in an optical cavity (6) able to reflect a pump (2). The crystal (5, 55, 105) has an entrance face (59) and an exit face (60), through which faces the optical axis passes, an upper face (57) and a lower face (58). The optical parametric oscillator (1) has a crystal (105) includes a grating of polarity-inverted lines (106) originating separately and in a narrowly spaced manner at a fictional upper line (61) that is parallel to the upper face (57) of the crystal (105), and ending separately and in a widely spaced manner either at a fictional lower line (63) that is parallel to the lower face (58) of the crystal (105), or at the entrance face (59) of the crystal, two successive lines (106) making between each other a constant angle, the grating starting with a first line (108) originating at the exit face (60) of the crystal (105) and extending towards the lower fictional straight line (63) while diverging from said exit face (60). All the other lines (Continued)

gradually and monotonically inclining from the first straight line (108) towards the entrance face (59) of the crystal (105).

9 Claims, 2 Drawing Sheets

(56) References Cited

U.S. PATENT DOCUMENTS

| | | | |
|---|---|---|---|
| 8,542,435 B2 | 9/2013 | Ra Ybaut | |
| 2008/0044147 A1* | 2/2008 | Patel | G02F 1/3558 385/122 |
| 2009/0257462 A1 | 10/2009 | Furukawa et al. | |
| 2015/0185077 A1 | 7/2015 | Malcolm | |
| 2017/0356734 A1* | 12/2017 | Hendon | G02F 1/3775 |

OTHER PUBLICATIONS

International Search Report dated Apr. 25, 2019.
P. E. Powers et al: "Continuous tuning a continuous-wave periodically poled ithium niobate optical parametric oscillator by use of a fan-out grating design" Optics Letters, vol. 23, No. 3, Feb. 1, 1998.

* cited by examiner

OPTICAL PARAMETRIC OSCILLATOR

RELATED APPLICATION

This application is a National Phase of PCT/FR2019/050448 filed on Feb. 27, 2019 which claims the benefit of priority from French Patent Application No. 18 51802, filed on Mar. 1, 2018, the entirety of which are incorporated by reference.

FIELD OF THE INVENTION

The invention relates to an optical parametric oscillator.

An optical parametric oscillator (OPO) is a frequency converter that, from a laser wave of angular frequency $w_p$ (pump), produces two new waves that are referred to as the "signal" and "idler" waves, of respective angular frequencies $w_s$ and $w_c$ such that $w_p = w_s + w_c$.

DESCRIPTION OF RELATED ART

Parametric frequency conversion is obtained by making the pump wave propagate through a component, generally a crystal, having an optical non-linearity of order 2. If the physical parameters of the crystal, such as its temperature, its angle with respect to the pump radiation or even the periodicity of its ferroelectric domains (e.g. periodic domain inversion in the case of a crystal such as lithium niobate) are modified, the values $w_s$ and $w_c$ may be adjusted over a very wide range.

Thus, an OPO is a coherent light source that is tunable in a spectral range that is very wide and much wider than that of lasers. This essential feature opens many fields of application to OPOs, such as for example the spectroscopic analysis of gases.

An optical parametric oscillator according to the invention is a nested cavity optical parametric oscillator (NesCOPO), i.e. an OPO based on two separately resonant cavities, each of which exhibits resonance at one of the wavelengths generated by the parametric conversion of order two. Such an OPO is doubly resonant, with a double passage of the pump.

European patent application EP2503387 describes a NesCOPO parametric oscillator that employs a lithium-niobate fan-out crystal of continuously variable pitch. Such an oscillator possesses the drawback of comprising a crystal the ferroelectric domains of which are not optimally oriented, this inducing wavenumbers that the source cannot emit without change of a parameter, the temperature of the crystal for example.

OBJECTS AND SUMMARY

An optical parametric oscillator according to the invention comprises a crystal the ferroelectric patterns of which have been optimized to provide access to the entirety of the desired wavelength range, without having to modify certain crystal-related parameters, such as its temperature for example.

The notions of "upper", "lower", "front" and "back" must be interpreted as though the crystal were placed in an operational position in the optical cavity of the optical parametric oscillator.

One subject of the invention is a doubly resonant optical parametric oscillator comprising a fan-out crystal having an optical non-linearity of order 2 and placed in an optical cavity able to reflect a pump, said crystal comprising an entrance face and an exit face, through which faces the optical axis passes, an upper face and a lower face.

The main feature of an optical parametric oscillator according to the invention is that said crystal includes a grating of polarity-inverted lines originating separately and in a narrowly spaced manner at a fictional upper line that is parallel to the upper face of the crystal, and ending separately and in a widely spaced manner either at a fictional lower line that is parallel to the lower face of the crystal, or at the entrance face of the crystal, two successive lines making between each other a constant angle, said grating starting with a first line originating at the exit face of the crystal and extending towards the lower fictional straight line while diverging from said exit face, all the other lines gradually and monotonically inclining from said first straight line towards the entrance face of the crystal.

In other words, a first line of the grating starts at the exit face of the crystal and diverges from said exit face, and all the other lines are inclined towards the entrance face of the crystal, from this first line, so as to increasingly diverge from the exit face. The first line is the only line that originates at the exit face, all the other lines of the grating located away from said exit face. In other words, the grating of lines gives the impression of rotating from the exit face of the crystal to the entrance face thereof, it starting with a first line that has only one point of contact with the exit face of the crystal. It will be noted that all the lines of the grating originate at the upper fictional straight line, including the first polarity-inverted line.

Advantageously, the four faces of the crystal are planar.

Preferably, the upper face and the lower face are parallel, and the entrance face and the exit face are parallel. In this way, the crystal is of a parallelepipedal shape with a small thickness.

Preferably, the lines located just after the first line and said first line as well end at the lower fictional straight line, the following lines ending at the entrance face. The expression "ending at the entrance face" must be understood to mean "emerging onto the entrance face".

Advantageously, the constant angle of inclination between two successive lines is about 0.1 mrad. The expression "about 0.1 mrad" means equal to 0.1 mrad plus or minus 0.05 mrad.

Preferably, the crystal is made of lithium niobate. This material is particularly but not exclusively suitable for a parametric optical oscillator according to the invention.

Preferably, the grating comprises an original line placed before the first line, said original line originating at the exit face below the upper fictional straight line and ending at the lower straight line.

Advantageously, the first line is inclined with respect to the exit face by an angle that is larger than or equal to the constant angle separating two successive lines. This angle of inclination is preferably comprised between 1 times and 2 times the constant angle of inclination between two successive lines of the grating.

Another subject of the invention is a crystal, for producing an oscillator according to the invention, said crystal comprising an entrance face and an exit face, through which faces the optical axis passes, an upper face and a lower face.

The main feature of a crystal according to the invention is that said crystal includes a grating of polarity-inverted lines originating in a narrowly spaced manner at a fictional upper line that is parallel to the upper face of the crystal, and ending in a widely spaced manner either at a fictional lower line that is parallel to the lower face of the crystal, or at the entrance face of the crystal, two successive lines making between each other a constant angle, said grating starting with a first line originating at the exit face of the crystal and extending towards the lower fictional straight line, all the other lines gradually and monotonically inclining from said first straight line towards the entrance face of the crystal.

An optical parametric oscillator according to the invention has the advantage of being able to achieve each wavenumber in a range of given wavelengths, the unachievable regions that are observed with current optical parametric oscillators being removed. This achievement is obtained by means of a particular design of the polarity-inverted lines of the grating, thus allowing the need to set the temperature of the crystal to be avoided.

BRIEF DESCRIPTION OF THE DRAWINGS

A detailed description of an optical parametric oscillator according to the invention is given below, with reference to the following figures.

In the rest of the description the terms "OPO" and "optical parametric oscillator" are equivalent.

DETAILED DESCRIPTION

Figure 1:
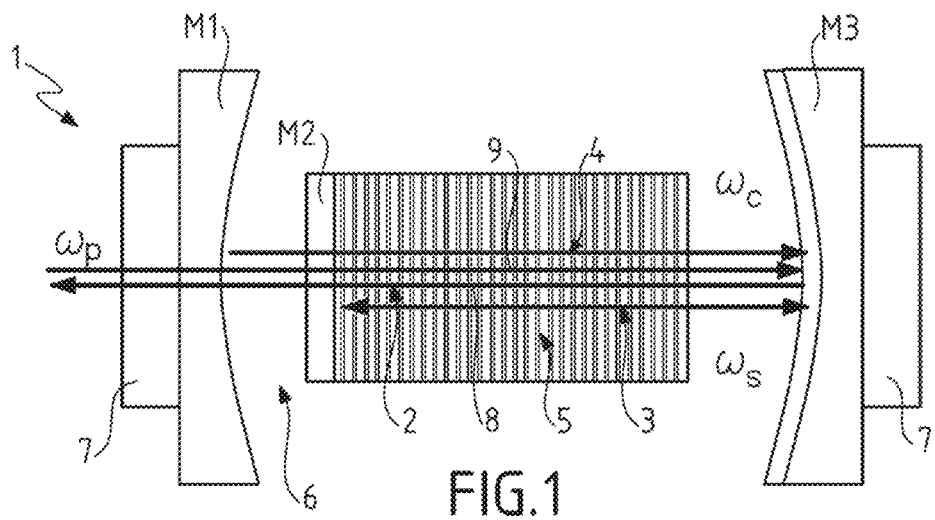
FIG. 1 is a schematic view of a prior-art optical parametric oscillator.

With reference to FIG. 1, an optical parametric oscillator 1 is a system allowing a pump wave 2 produced by a laser beam to be converted into two waves, a "signal" wave 3 and an "idler" wave 3, by way of a non-linear crystal 5, which may for example be made of lithium niobate. This crystal 5 is placed in an optical cavity 6 that is bounded by a first mirror M1 and by a second mirror M3. These two mirrors M1 and M3 are mounted on piezoelectric elements 7 in order to allow the optical cavity 6 to be tuned. The crystal 5 in the example illustrated in FIG. 1 comprises a third mirror M2. The pump wave 2 is converted in the crystal 5 placed in the optical cavity 6. In the context of an OPO 1 according to the invention, the crystal 5 is periodically poled lithium niobate (PPLN).

The architecture of an OPO 1 according to the invention is also referred to by the acronym NesCOPO (for nested cavity optical parametric oscillator). The pump wave 2 possesses an incident component 8, which originates at the first mirror M1, and a reflected component 9, which is obtained following reflection of said incident wave 8 from the second mirror M3 of the optical cavity 6. By way of illustrative and non-limiting example, the wavelength of the pump 2 is 1 μm, that of the signal wave 3 is in the range comprised between 1.4 μm and 1.6 μm and that of the idler wave 4 is in the range comprised between 3.2 μm and 4.2 μm.

An OPO 1 according to the invention capitalizes upon the non-linear frequency conversion within the crystal 5 placed in the optical cavity 6. This OPO 1 is doubly resonant with double passage of the pump 2 (incident component 8 and reflected component 9).

Figure 2:
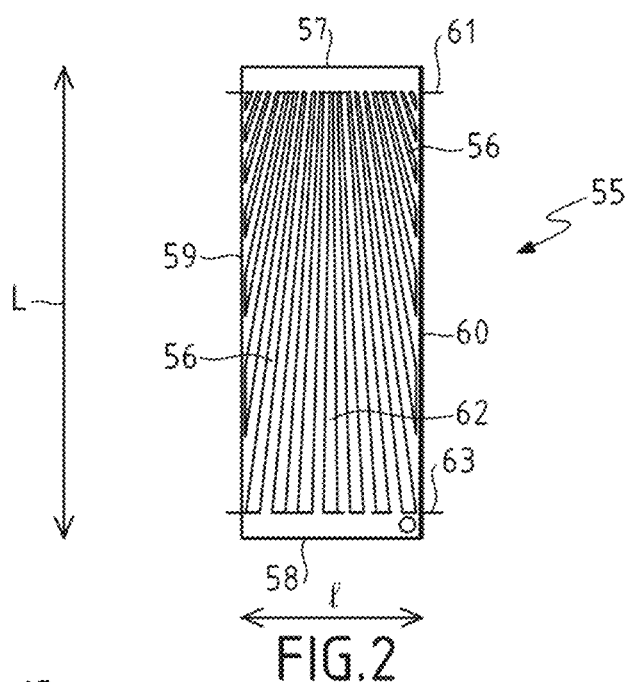
FIG. 2 is a front-on view of a fan-out crystal used in a prior-art optical parametric oscillator.

With reference to FIG. 2, an existing fan-out crystal 55 possesses a grating of polarity-inverted lines 56 that allow a continuous variation in the generated wavelength to be obtained, by moving said crystal 55 within the optical cavity 6. Schematically, such a crystal 55 is of parallelepipedal shape and possesses, A planar upper face 57, A planar lower face 58 that is parallel to the upper surface 57, A planar entrance face 59, through which the pump wave 2 that passes through the first mirror M1 will penetrate into the crystal 55, A planar exit face 60 that is parallel to the entrance surface 59, Two rectangular and parallel lateral faces 61, which are each bounded by the upper face 57, the lower face 58, the entrance face 59 and the exit face 60.

Such a crystal 55 may, for example, have a length L of 10 mm, a width I of 5 mm and a thickness of 1 mm. These dimensions illustrate an example that is suitable for an OPO according to the invention, but that is non-limiting.

The polarity-inverted lines 56 are organized within the crystal 55 so that they originate at an upper fictional straight line 61, which is parallel to the upper wall 57 and located in proximity thereto. These lines 56 originate separately and in a narrowly spaced manner on said straight line 61 and do so over the entire width of the crystal 55. A central line 62 starts from the middle of the upper straight line 61 and extends parallel to the entrance face 59 or to the exit face 60, towards a lower fictional straight line 63, which is parallel to the upper fictional straight line 61, and which is located in proximity to the lower face 58 of the crystal 55. Some of lines 56, which are located, on the upper straight line 61, on one side of the central line 62, extend towards the lower fictional straight line 63, this being those that are closest to said central line 62, and others thereof extend towards the exit face 60, this being those that are furthest from said central line 62. Some of lines 56, which are located, on the upper straight line 61, on the other side of the central line 62, extend towards the lower fictional straight line 63, this being those that are closest to said central line 62, and others thereof extend towards the entrance face 59, this being those that are furthest from said central line 62. Two successive lines 56 of the grating diverge from each other, as they extend from their location on the upper straight line 61 towards the lower straight line 63 or towards the entrance face 59 or exit face 60. In this way, two successive polarity-inverted lines 56 make therebetween a constant angle, which is preferably equal to 0.1 mrad.

To summarize, the grating of lines 56 has an axis of symmetry embodied by the central line 62, some of the lines 56, which lines are located on one side of said central line 62, having a tendency to extend towards the entrance face 59, and the rest of said lines 56, which lines are located on the other side of said central line 56, having the tendency to extend towards the exit face 60.

The pump 2, the beam size of which may for example be about 100 μm, reaches the entrance face 59 and passes through the crystal 55 in order to exit therefrom via the exit face 60. The crystal 55 may be translated within the optical cavity 6, along a longitudinal axis of said crystal 55 in order to change the parameters of the conversion and achieve a given wavenumber.

Figure 3:
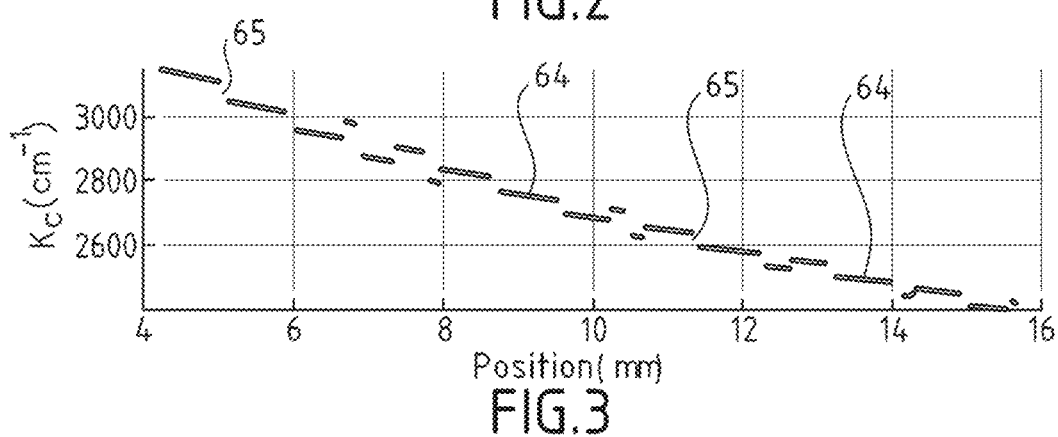
FIG. 3 is a graph illustrating an example of accessible wavenumber as a function of the position of the crystal of FIG. 2 in the optical cavity of a prior-art OPO.

Now, with reference to FIG. 3, with such a fan-out crystal 55, the conversion conditions within an NesCOPO generally only allow solely certain wavelength ranges 64 to be accessed, these ranges being separated by inaccessible ranges 65, as the holes in the graph indicate for the various positions of the crystal 55 in the optical cavity 6. Specifically, the crystal 55 may be translated in the optical cavity 6 along an axis parallel to a longitudinal axis of said crystal 55, so as to obtain all the possible wavelengths in a given range. However, the exploitable regions do not overlap, and unachievable wavenumbers are observed to appear. This is a result of the conditions on the relative phase between the three waves (pump, signal, idler), which is important to take into account in NesCOPOs.

Currently, ways exist to avoid these holes 65, but they are either very expensive, or not industrially applicable, or slow.

An OPO according to the invention includes a crystal 105 the polarity-inverted lines 106 of which are organized, in said crystal 105, in such a way that they allow all the wavelengths to be accessed, when the crystal 105 is translated in the optical cavity 6 along a longitudinal axis thereof.

Figure 4:
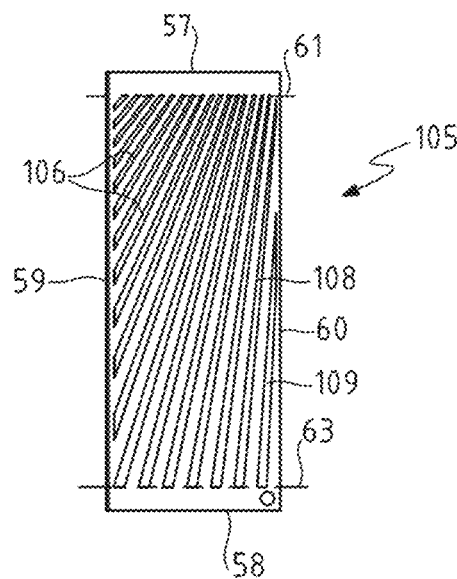
FIG. 4 is a front-on view of a fan-out crystal according to the invention.

With reference to FIG. 4, the crystal 105 of an OPO according to the invention differs from that described above only in the arrangement of the polarity-inverted lines 106 within the crystal 105. Specifically, the polarity-inverted lines 106 are organized within the crystal 105 so that they originate at the upper fictional straight line 61 described above, which is parallel to the upper wall 57 and located in proximity thereto. These lines 106 originate separately and in a narrowly spaced manner on said straight line 61 and do so over the entire width of the crystal 105. Each polarity-inverted line 106 of the grating of a crystal 105 of an OPO according to the invention is obtained, from each polarity-inverted line 56 of the grating of the crystal 55 described above, via a rotation in the clockwise direction, about its point of intersection with the upper fictional straight line 61, by a constant angle comprised between 1° and 10°. In this way, each polarity-inverted line 106 of a crystal 105 according to the invention is pivoted towards the entrance face 59 by an angle comprised between 1° and 10° from its position in the existing crystal 55 illustrated in FIG. 2. For a crystal having a length of 10 mm, a width of 5 mm and a thickness of 1 mm, this angle is advantageously equal to 2.8°.

In other words, the grating of polarity-inverted lines 106 starts with a first line 108 originating on the exit face 60 of the crystal 105 at the upper fictional straight line 61, and extends towards the lower fictional straight line 63 described above, all the other lines gradually and monotonically inclining from said first line 108 towards the entrance face 59. Two successive lines 106 diverge from each other, as they extend from this location on the upper straight line 61 towards the lower straight line 63 or towards the entrance face 59. In this way, two successive polarity-inverted lines 106 make between each other a constant angle, which is preferably equal to 0.1 mrad, just as is the case in the existing crystal 55 described above. The lines 106 located just after the first line 108 extend to the lower fictional straight line 63, the other lines emerging onto the entrance face 59 of the crystal 105.

The grating also comprises an original line 109 placed between the first line 108 and the exit face 60, this original line 109 originating at the exit face 60, below the point at which the first line 108 originates on said exit face 60, and ending on the lower fictional straight line 63. This original line 109 is shorter than the first line 108.

To summarize, with respect to an axis extending along the exit face 60, all the polarity-inverted lines 106 are inclined in the same direction and on the same side (towards the entrance face 59) in a crystal 105 according to the invention. In an already existing crystal 55, with respect to a central axis that is parallel to the entrance face 59 or to the exit face 60, they are inclined symmetrically on either side of said axis, in two opposite directions (towards the entrance face 59 and towards the exit face 60).

The typical period of a pattern in a PPLN crystal 105 is 30 μm.

Figure 5:
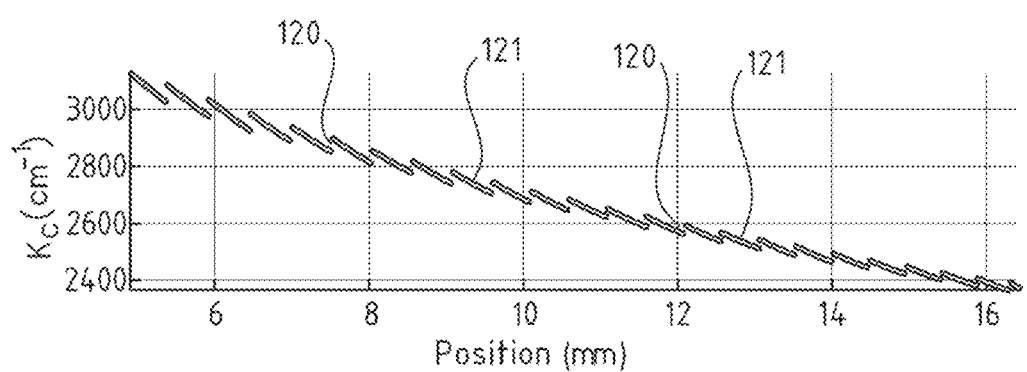
FIG. 5 is a graph illustrating an example of accessible wavenumber as a function of the position of the crystal of FIG. 4 in the optical cavity.

With reference to FIG. 5, by translating the crystal 105 along an axis parallel to the exit face 60 or to the entrance face 59, an OPO according to the invention allows all the wavelengths in a given range to be achieved. Specifically, various trials have shown that, by virtue of the use of a PPLN crystal 105 with the new grating of polarity-inverted lines 106 that was described above, each wavenumber may be reached. Focusing on a position 120 in the crystal 105 where phase-matching conditions are exactly non-constructive, it is still possible to achieve the desired wavelength, because the exploitable regions 121 overlap.

The invention claimed is:

1. A doubly resonant optical parametric oscillator comprising:
a fan-out crystal having an optical non-linearity of order 2 and placed in an optical cavity able to reflect a pump, said fan-out crystal having an entrance face and an exit face, and an optical axis passing through said entrance face and said exit face, an upper face and a lower face, wherein said fan-out crystal includes a grating of polarity-inverted lines originating separately and in a narrowly spaced manner at a fictional upper line that is parallel to the upper face of the fan-out crystal, and ending separately and in a widely spaced manner either at a fictional lower line that is parallel to the lower face of the fan-out crystal, or at the entrance face of the fan-out crystal, and in that two polarity-inverted successive lines make between each other a constant angle, said grating starting with a first straight line originating at the exit face of the fan-out crystal and extending towards the fictional lower line while diverging from said exit face, all the other polarity-inverted lines gradually and monotonically inclining from said first straight line towards the entrance face of the fan-out crystal.

2. The doubly resonant optical parametric oscillator according to claim 1, wherein the four faces of the fan-out crystal are planar.

3. The doubly resonant optical parametric oscillator according to claim 1, wherein the upper face and the lower face are parallel, and in that the entrance face and the exit face are parallel.

4. The doubly resonant optical parametric oscillator according to claim 1, wherein the polarity-inverted lines located just after the first straight line as well end at the fictional lower line, and in that the following polarity inverted lines end at the entrance face.

5. The doubly resonant optical parametric oscillator according to claim 1, wherein the constant angle of inclination between two successive polarity-inverted lines is about 0.1 mrad.

6. The doubly resonant optical parametric oscillator according to claim 1, wherein the fan-out crystal is made of lithium niobate.

7. The doubly resonant optical parametric oscillator according to claim 1, wherein the grating comprises an original line placed before the first straight line, and in that said original line originates at the exit face below the fictional upper line and ends at the fictional lower line.

8. The doubly resonant optical parametric oscillator according to claim 1, wherein the first straight line is inclined with respect to the exit face by an angle that is larger than or equal to the constant angle separating two polarity-inverted successive lines.

9. A fan-out crystal for operation within a doubly resonant optical parametric oscillator according to claim 1, wherein said fan-out crystal comprises:
   an entrance face and an exit face, through which faces the optical axis passes, an upper face and a lower face,
   wherein said fan-out crystal includes a grating of polarity-inverted lines originating separately and in a narrowly spaced manner at a fictional upper line that is parallel to the upper face of the fan-out crystal, and ending separately and in a widely spaced manner either at a fictional lower line that is parallel to the lower face of the fan-out crystal, or at the entrance face, and in that two successive polarity-inverted lines make between each other a constant angle, said grating starting with a first straight line originating at the exit face of the fan-out crystal and extending towards the fictional lower line while diverging from said exit face, all the other polarity-inverted lines gradually and monotonically inclining from said first straight line towards the entrance face of the fan-out crystal.

\* \* \* \* \*